United States Patent [19]

Reichman et al.

[11] Patent Number: 4,656,103
[45] Date of Patent: Apr. 7, 1987

[54] LIQUID JUNCTION PHOTOELECTRODES USING AMORPHOUS SILICON-BASED THIN FILM SEMICONDUCTOR

[75] Inventors: Benjamin Reichman, Birmingham; Gao Liang, Detroit; Krishna Sapru, Troy, all of Mich.

[73] Assignee: Energy Conversion Devices, Inc., Troy, Mich.

[21] Appl. No.: 736,433

[22] Filed: May 20, 1985

Related U.S. Application Data

[63] Continuation-in-part of Ser. No. 467,501, Feb. 18, 1983, abandoned.

[51] Int. Cl.$^4$ .................. H01M 6/36; C25B 1/02
[52] U.S. Cl. .................. 429/111; 204/266; 204/290 R; 204/DIG. 3; 204/129
[58] Field of Search .......... 204/290 R, 266, DIG. 3, 204/129; 429/111; 136/258 AM, 259

[56] References Cited

U.S. PATENT DOCUMENTS 4,525,436  6/1985  Yamazaki .................. 429/111

FOREIGN PATENT DOCUMENTS 0051980  5/1982  European Pat. Off. ............ 429/111

OTHER PUBLICATIONS

D. J. Harrison et al., *J. Am. Chem. Soc.*, vol. 105, pp. 4212–4219 (Jul. 1983).
W. M. Ayers, *J. Appl. Phys.*, vol. 53, pp. 6911–6918 (Oct. 1982).
W. M. Ayers, *J. Electrochem. Soc.*, vol. 129, pp. 1644–1646 (1982).
R. Williams, *J. Appl. Phys.*, vol. 50, pp. 2848–2851 (1979).
T. Skotheim et al., *Appl. Phys. Lett.*, vol. 40, pp. 281–283 (1982).

*Primary Examiner*—Aaron Weisstuch
*Attorney, Agent, or Firm*—James D. Ryndak; Lawrence G. Norris; Richard M. Goldman

[57] ABSTRACT

An amorphous silicon semiconductor alloy having multiple layers is used to form a photoelectrode (either a photoanode or a photocathode) for use in a photoelectrochemical cell for the photoelectrolysis of water to produce hydrogen or the conversion of solar energy into electrical energy. Each layer of the semiconductor alloy has a different dopant concentration ranging from no dopant to a heavy dopant concentration. The photoelectrochemical cell can utilize a photocathode and a conventional metal anode, a photoanode or both a photocathode and a photoanode according to the present invention. The semiconductor alloy of the photoelectrode is a-Si:F:H or a-Si:H$_x$ deposited on a reflective layer of aluminum or molybdenum which is deposited on a substrate of glass or stainless steel. A tunnelable oxide layer can be deposited or intrinsically formed to cover and protect the top surface of the semiconductor alloy body. The photoanode is of an n-type configuration while the photocathodes can be either a p-type or a P-I-N type configuration.

16 Claims, 4 Drawing Figures

LIQUID JUNCTION PHOTOELECTRODES USING AMORPHOUS SILICON-BASED THIN FILM SEMICONDUCTOR

BACKGROUND OF THE INVENTION

This application is a continuation-in-part of application Ser. No. 467,501 filed Feb. 18, 1983, now abandoned, for Liquid Junction Photoelectrodes Using Amorphous Silicon-Based Thin Film Semiconductors.

This invention relates to liquid junction photoelectrochemical cells and in particular to photoelectrode structures for liquid junction photovoltaic cells.

Numerous types of devices which convert solar energy into electrical energy are known. One class of device which is of particular interest is the liquid-junction photovoltaic cell, which provides an attractive structure not only to convert solar energy into electrical energy, but also to decompose water to obtain hydrogen. Considerable interest in hydrogen production via the solar decomposition of water exists because water is an exceedingly abundant and inexpensive source of raw materials and hydrogen is an easily storable nonpolluting fuel which can be used for transportation, heating and the generation of electricity. Indeed, the generation and storage of hydrogen is an attractive energy alternative to the direct storage of electricity using batteries.

The generation of hydrogen in a liquid junction photovoltaic cell requires at least one photoelectrode in an electrolyte. The electrolyte may be either acidic or alkaline. When the electrolyte is acidic, the reaction at the cathode is:

$$2H^+ + 2e^- \rightarrow H_2. \quad (a)$$

This reaction proceeds in the dark as sufficient electrons are available. At the anode, the reaction is:

$$H_2O + 2h^+ \rightarrow 2H^+ + \tfrac{1}{2}O_2. \quad (b)$$

When the electrolyte is alkaline, the reaction at the cathode is:

$$H_2O + e^- \rightarrow \tfrac{1}{2}H_2 + OH^- \quad (c)$$

and the reaction at the anode is:

$$2OH^- + 2h^+ \rightarrow H_2O + \tfrac{1}{2}O_2. \quad (d)$$

An electrolytic cell utilized for electrolysis can utilize a photocathode and a conventional metal anode, a photoanode and a conventional metal cathode, or a photoanode and photocathode.

In addition to utilization of an acidic or alkaline electrolyte for the direct production of hydrogen, a redox couple can also be used for the electrolyte. The redox couple is utilized for the direct production of electricity instead of producing hydrogen and the couple is selected to have a chemical potential within the band gap of the photoelectrode. A detailed discussion of the operation of cells utilizing a liquid junction photoanode, a photocathode, or both to convert solar energy into electrical energy is contained in the article entitled "Conversion of Sunlight into Electrical Power and Photoassisted Electrolysis of Water in Photoelectrochemical Cells" by Adam Heller in *Accounts of Chemical Research*, Volume 14, pp 154–162, published in 1981.

For optimum efficiency the semiconductor utilized for the photoelectrode should have a band gap in the approximate range of 1.5 to 1.7 eV, with a Fermi level which is compatible with the electrolytic solution. For an n-type semiconductor, the water electrolysis process proceeds best when the semiconductor has a band gap slightly greater than 1.5 eV, with a work function sufficiently small that electrons diffuse into the water to attain thermal equilibrium, thus causing the energy bands of the semiconductor to bend up near the interface of the electrolyte. The incident sunlight is then absorbed in the semiconductor, creating electron-hole pairs and the photoexcited holes are accelerated towards the semiconductor-electrolyte interface by the internal field. When holes are injected into the water at the correct energy, oxygen is evolved near the anode and hydrogen is evolved near the cathode according to the reactions described in equations a and b, or c and d, above, depending upon whether an acidic or alkaline system is utilized.

A major problem with prior attempts to develop photoelectrodes has been the inability to provide semiconductor materials which possess the capability of providing efficient solar conversion efficiencies while at the same time having the ability to maintain stability during operation. For example, the crystalline silicon semiconductor materials proposed for photoelectrode use have a band gap of about 1.1 eV, which is within the range for providing optimum sunlight absorption, but these materials decompose very rapidly during utilization. Other crystalline semiconductor materials, such as $TiO_2$, $WO_3$, and $SrTiO_3$ have been found to exhibit more acceptable stability for photoelectrode applications than the crystalline silicon semiconductor materials. These materials, however, generally have larger band gaps which are responsive only to an ultraviolet light spectrum. Since only a small fraction of the sunlight reaching the earth is in the ultraviolet light spectrum, the conversion efficiency of these materials is severely limited, making their use unacceptable. Cadmium sulfide (CdS) and gallium arsenide (GaAs) crystalline materials have proper band gaps of about 1.5 to 2.0 eV, but are not stable under photoelectrolysis conditions.

In accordance with the present invention, the photoelectrodes are fabricated utilizing one or more amorphous silicon based thin film semiconductor alloys. Amorphous silicon based semiconductor alloys are particularly useful because of the ability to independently control the work function, Fermi level, and energy gap of such amorphous alloy semiconductors. Furthermore, amorphous silicon-based semiconductor alloys can be formed to be less corrosive than crystalline materials while providing an electrode which efficiently converts solar energy into chemical energy by the photoelectrolysis of water. Specific amorphous alloy materials and the method of making them, which can be utilized as the photoelectrodes are disclosed in U.S. Pat. Nos. 4,217,374; 4,226,898, and 4,342,044 assigned to the assignee of record in this application, which are incorporated herein by reference.

SUMMARY OF THE INVENTION

A photoelectrode for a liquid junction photovoltaic device includes a substrate having a deposition surface and a thin film amorphous silicon alloy semiconductor body having at least two differently doped layers deposited on the deposition surface with one of the layers coupled to an electrically conductive lead of the cell.

In one embodiment, the semiconductor body can include a first p+ amorphous silicon alloy contact layer which is coupled to the electrical lead and is doped, for example with boron, to a concentration of about $10^{23}$ atoms/cm$^3$. A second amorphous silicon alloy layer is deposited on the first layer and is doped, for example with boron, to a concentration of about $10^{17}$ atoms/cm$^3$ to provide a photocathode. In accordance with the photocathode embodiment of the invention, the first layer has a thickness in the range of about 600 angstroms to about 1500 angstroms and the second layer has a thickness in the range of about 5000 angstroms to 6000 angstroms.

In another embodiment of the invention, the photoelectrode can be a photoanode. The semiconductor body includes a first n+ type amorphous silicon alloy contact layer which is doped, for example by phosphorus, to a concentration of about $10^{27}$ atoms/cm$^3$ and has a thickness in the range of 600 angstroms to 1500 angstroms. The first layer is coupled to an electrical lead. The second layer is not specifically doped, but can include n-type characteristics and preferably has a thickness in the range of about 5000 to 6000 angstroms.

The photoelectrode can include a tunnelable thin film oxide layer deposited to cover the semiconductor alloy to protect it from the electrolyte of the liquid junction photovoltaic device. The oxide layer can be a native oxide of the silicon alloy semiconductor material which is formed to a tunnelable thickness. In general, that thickness will be in the range of about 10 angstroms to 40 angstroms.

The photoelectrode can include a reflective layer deposited on the deposition surface of the substrate and disposed between the substrate and the first layer of the semiconductor body. The reflective layer is preferably either aluminum or molybdenum and has a thickness in the range of about 2000 angstroms.

In another embodiment, the semiconductor body can include a first layer of amorphous silicon alloy which is a p+ type layer doped to a concentration of $10^{23}$ atoms/cm$^3$ coupled to an electrical lead; a second layer of substantially intrinsic (slightly n-doped) amorphous silicon semiconductor alloy; and a third n+ type layer of amorphous silicon semiconductor alloy doped to a concentration of about $10^c$ atoms/cm$^3$. Preferably, the first layer has a thickness in the range of 200 angstroms to 1500 angstroms, the second layer has a thickness in the range of 5000 angstroms to 6000 angstroms and the third layer has a thickness in the range of about 600 angstroms to about 1500 angstroms.

Furthermore, a photoelectrochemical cell for the conversion of sunlight into electrical energy or energy stored in a fuel is contemplated by the present invention. The cell includes an interior space divided by a membrane to form an anode compartment and a cathode compartment. Both compartments contain an electrode with at least a portion of each electrode in contact with an electrolyte. At least one of the electrodes is a photoelectrode of the type described herein. The cell also includes means for impinging photons upon the photoelectrode for the conversion of sunlight into energy usable as electricity or a fuel. Electrically coupling an electrical power source to the electrodes allows photoassisted electrolysis to occur. Sunlight is converted into electrical energy when an electrical load is electrically coupled to the electrodes.

DETAILED DESCRIPTION

Figure 1:
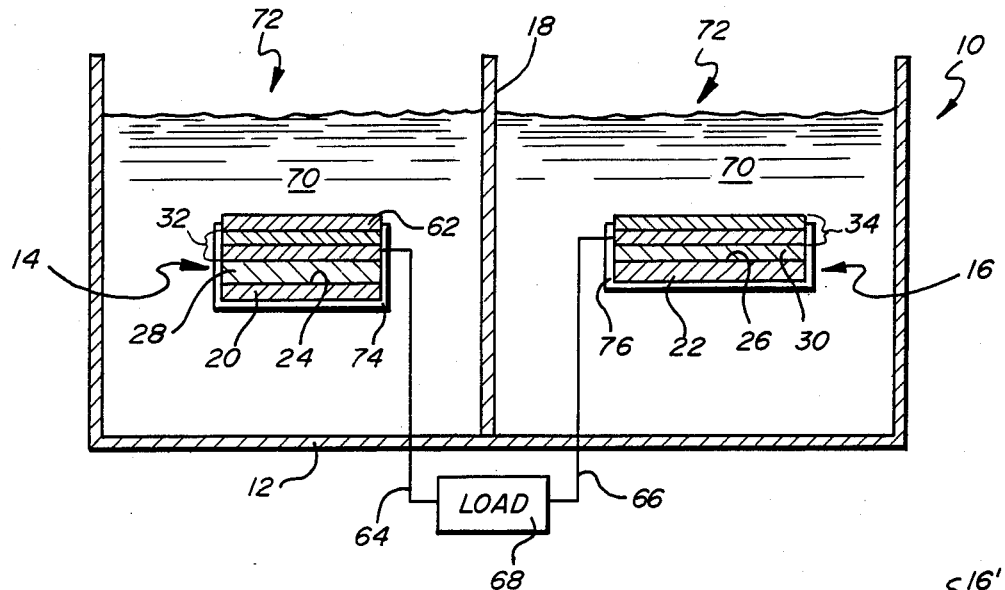
FIG. 1 is a schematic representation of a liquid junction photoelectrochemical cell which incorporates both a photoanode and a photocathode in accordance with the invention.

Referring to FIG. 1, a liquid junction photoelectrochemical cell 10 for the photoelectrolysis of water is illustrated. The cell 10 includes a container 12 with two photoelectrodes 14 and 16 immersed in an electrolyte. The photoelectrodes are separated by a membrane 18 and comprise a photoanode 14 and a photocathode 16. The photoelectrodes each have a substrate 20 and 22 with a deposition surface 24 and 26. The substrates 20 and 22 can be stainless steel, glass, or any other material which provides a relatively rigid support.

Conventional deposition techniques such as sputter or vapor deposition can be utilized to deposit a thin reflective layer 28 and 30 on the substrate deposition surfaces 24 and 26. The reflective layers 28 and 30 preferably can be formed from molybdenum, aluminum, or any other suitable conductive material which has a thickness sufficient to ensure that it is not transparent. A nontransparent first electrode of molybdenum results when the molybdenum has a thickness greater than about 300 angstroms. In the preferred embodiment, the reflective layers 28 and 30 will have a thickness in the range of about 2000 angstroms.

Next, a multilayer amorphous silicon semiconductor alloy body 32 and 34 is deposited on the reflective layers 28 and 30. The amorphous silicon semiconductor alloy bodies 32 and 34 preferably are either a-Si:F:H or a-Si:H$_x$ alloys. The alloys can be deposited by plasma or glow discharge techniques described in the above referred patents.

Figure 2:
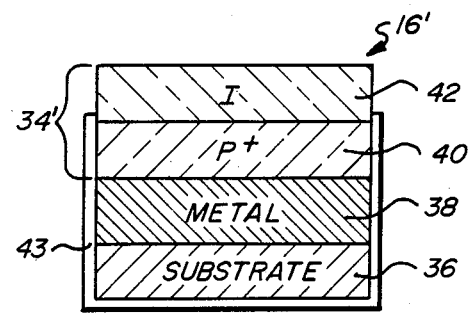
FIG. 2 is a section of a p-type photocathode in accordance with the invention.
Figure 3:
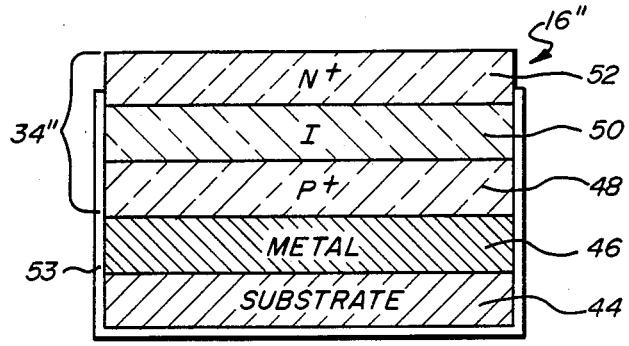
FIG. 3 is a section of a PIN type photocathode in accordance with the invention.
Figure 4:
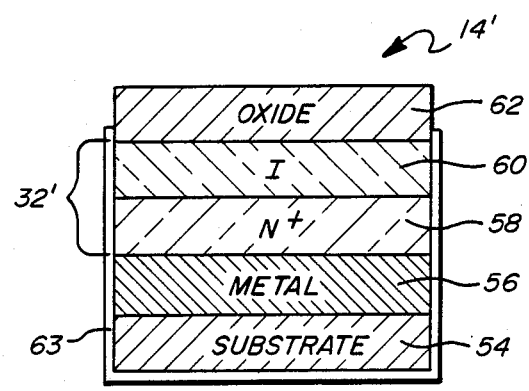
FIG. 4 is a section of an n-type photoanode in accordance with the invention.

Specific embodiments of multilayer amorphous silicon alloy photoelectrodes are illustrated in FIGS. 2, 3 and 4. Referring initially to FIG. 2, a p+ type photocathode 16' is illustrated which includes a stainless steel or glass substrate 36 on which is deposited a reflective layer 38, preferably of aluminum approximately 2000 angstroms thick. The multilayer amorphous silicon alloy body 34' is formed by first forming or otherwise depositing a p+ type layer 40 of a-Si:F:H or a-Si:H$_x$ material doped with boron to a concentration of about $10^{23}$ atoms/cm$^2$ on the reflective layer 38. The p+ type layer 40 is a contact layer to which an electrical lead can be attached and has a preferred thickness in the range of about 600 angstroms to 1500 angstroms. Finally, a top layer 42 of substantially intrinsic (I) a-Si:H$_x$ or a-Si:F:H can be deposited to a thickness of about 5000 angstroms to 6000 angstroms. The top layer is very slightly doped p-type, such as with boron, to a concentration of about $10^{17}$ atoms/cm$^3$. The photocathode 16' can be formed with or without the top layer 42. The edges of the layers 36, 38, and 40 are coated with an impervious insulative material 43.

Referring to FIG. 3, a PIN type photocathode 16" is formed in accordance with the invention with a glass or stainless steel substrate 44, a molybdenum reflective layer 46 deposited on the substrate 44 to a thickness of about 2000 angstroms, a multilayer amorphous silicon semiconductor alloy body 34″ deposited on the reflective layer 46. The multilayer amorphous silicon semiconductor alloy 34″ is formed by first forming a p+ type a-Si:F:H or a-Si:H$_x$ conductive layer 48 doped with boron to a concentration of about $10^{23}$ atoms/cm$^3$. The first layer 48 is preferably in the range of about 200 angstroms to 1500 angstroms thick. A layer 50 of substantially intrinsic (I) (slightly n-doped) a-Si:F:H or a-Si:H$_x$ semiconductor alloy of approximately 5000 to 6000 angstroms thick is formed on the layer 48. Finally, a top layer 52 is formed of an n+ type a-Si:F:H or a-Si:H$_x$ semiconductor alloy doped with phosphorus to a concentration of about $10^e$ atoms/cm$^3$. The edges of layers 44, 46, 48, and 50 are coated with an impervious insulative material 53.

Referring to FIG. 4, an n-type photoanode 14′ has a substrate 54 which is made from glass, stainless steel, or other similar material, and a reflecting molybdenum layer 56 is formed thereon which is approximatley 200 angstroms thick. An amorphous silicon alloy multilayer body 32′ is formed by depositing an n+ type a-Si:F:H or a-Si:H$_x$ semiconductor layer 58 doped with phosphorus to a concentration of about $10^{27}$ atoms/cm$^3$. The thickness of the first layer 58 is approximately 600 angstroms to 1500 angstroms. Next, a layer 60 of substantially intrinsic (I) (slightly n-doped) a:Si:F:H or a-Si:H$_x$ semiconductor in the range of about 5000 angstroms to 6000 angstroms thick is deposited. Finally, a top oxide layer 62 is deposited or otherwise formed over the exposed surface of the intrinsic semiconductor layer 60 to primarily increase the conversion efficiency. The edges of layers 54, 56, 58, and 60 are coated with an impervious insulative material 63.

The present inventtion is advantageously used in liquid junction photoelectrochemical devices having electrolytes which may or may not contain a redox couple. The prior art is limited to using a redox couple in order to prevent photocorrosion of the photoelectrode. The concentrations discussed above for the dopants boron and phosphorus are critical to the stability of the photoelectrode and preventing photocorrosion in the absence of a redox couple in the electrolyte. Other dopant materials are not necessarily limited to these concentrations.

The oxide layer 60 has a tunnelable thickness so that current will pass through the oxide layer 60 even though in bulk form the oxide layer can be an insulator. In order to assure the existence of the tunnel effect, the oxide layer 60 preferably is between about 10 angstroms and 40 angstroms in thickness, depending upon the type of semiconductor material on which the oxide layer is deposited. The oxide layer can be either a native dielectric which, for example, is grown by oxidizing the surface of the intrinsic semiconductor layer 60 or can be a separately deposited dielectric. In the latter case, the oxide layer can be any of a number of different oxides including $Nb_2O_5$, $Sb_2O_3$, $SiO_2$, $TiO_2$, $Ta_2O_5$, or any other suitable material which will operate to increase the conversion efficiency. Details of the construction and operation of one oxide layer 62 are described in patent application Ser. No. 353,767, now abandoned, entitled "Liquid Junction Photovoltaic Device With Tunnelable Interfacial Layer," filed Mar. 1, 1982, with application is herein incorporated by reference.

In accordance with the invention, photoassisted electrolysis can occur utilizing both a photocathode such as the photocathodes 16′ and 16″ described in conjunction with FIG. 2 or 3 and a photoanode such as the photoanode 14a described in connection with FIG. 4. Alternatively, only one photoelectrode along with a conventional metal counterelectrode can be utilized.

Returning to FIG. 1, the photoelectrochemical device 10 illustrated has a photoanode 14 and a photocathode 16 constructed in the manner described in conjunction with FIGS. 4 and 2. A pair of suitable electrically conductive leads 64 and 66 are attached between the contact layers 58 and 40 and a load 68. A suitable electrolyte 70 is then placed in the container 12 to cover the photoelectrodes 14 and 16 so that when photons 72 impinge upon the electrodes, photoelectrolysis will occur according to the above described reactions. The edges of the alloy bodies 32 and 34, reflective layers 28 and 30, and substrates 20 and 22 are coated with insulating layers 74 and 76 impervious to the electrolyte 70.

Photoelectrodes have been utilized in photoelectrolysis as described in Example 1 and for the conversion of sunlight into electrical energy as described in Examples 2 through 4 hereafter. In photoelectrolysis, the operation can be assisted by replacing the load 68 with a source of electrical power.

EXAMPLE 1

An a-Si:H$_x$ (boron doped) ss/p+/p photocathode of the structure described in FIG. 2 was tested in a 1.0M KCl electrolyte. The photocathode has a Voc. vs. a SCE reference electrode of −0.64 V and a current of 0.34 mA/cm$^2$ at −1.20 volts at a light intensity of 45 mW/cm$^2$. Hydrogen gas evolved from the electrode upon illumination of the electrode. A PIN type photocathode of the type described in FIG. 3 was tested under the same conditions and had a −0.30 Voc, and 1.6 mA/cm$^2$ current at −1.20 volts. The stability of the photocathode to photocorrosion was demonstrated by continuing the testing in the absence of a redox couple for over five hours. No visible performance or degradation was observed before arbitrarily terminating the test.

EXAMPLE 2

An n-type photoanode of the type described in FIG. 4 was tested in a half cell with an electrolyte comprising 1M tetramethylammonium salt/ethanol containing ferrocenium ion as a redox couple. Conversion efficiencies of 2.4%, 1.1%, and 0.45% were obtained at illuminations of 10 mW/cm$^2$, 45 mW/cm$^2$, and 100 mW/cm$^2$, respectively. The photoanode's stability to photocorrosion was demonstrated by testing for over five hours without visible or performance degradation.

EXAMPLE 3

A PIN-type photocathode of the type described in FIG. 3 was also tested for conversion of solar to electrical energy. The half cell electrolyte was 30% aqueous acetonitrile containing 0.1M KI and 25 mM methyviologen. Versus a SCE reference electrode, the Voc was 0.7 V, and the Isc was 1.4 mA/cm$^2$. Conversion efficiency was 0.22%. The stability of the photocathode to photocorrosion was demonstrated by continuously testing for several hours without visible or performance degradation before arbitrarily terminating the test.

EXAMPLE 4

A p-type photocathode of the type described in FIG. 2 was tested in the same cell as the PIN device. The p-type photocathode provided an efficiency of 0.05%, a Voc of 0.14 V, and Isc of 1.1 mA/cm². The photocathode's stability was demonstrated by continuing the tests of the absence of a redox coupled for over five hours without visible or performance degradation.

EXAMPLE 5

Amorphous films of Si:H$_x$ and Si:H:F alloys were prepared by r.f. glow discharge and doped with phosphorus to make n-type semiconductors which were tested as photoanodes in an electrochemical cell containing non-aqueus electrolyte solutions. The performance of liquid-junction photovoltaic cells based on these films was studied in a 0.1M TBAP/EtOH solution containing ferrocene/ferrocenium ion as a redox coupled and compared to that of single crystalline n-Si in Table 1.

TABLE 1

| ELECTRODE | LIGHT INTENSITY (mW/cm) | Voc (V, Pt) | Isc (mA/cm) | Vm (v, Pt) | Im (mA/cm²) | FF | n % |
|---|---|---|---|---|---|---|---|
| SC—Si | 50 | 0.5 | 0.9 | 0.20 | 0.34 | 0.15 | 0.14 |
|  | 100 | 0.5 | 1.0 | 0.18 | 0.41 | 0.15 | 0.07 |
| a-SiHx | 50 | 0.84 | 1.20 | 0.30 | 0.62 | 0.18 | 0.37 |
|  | 100 | 0.84 | 1.45 | 0.35 | 0.60 | 0.18 | 0.21 |
| a-SiHF | 50 | 0.76 | 1.0 | 0.32 | 0.62 | 0.25 | 0.38 |
|  | 100 | 0.76 | 1.90 | 0.35 | 1.10 | 0.27 | 0.39 |

The open circuit voltages and fill factors with the amorphous films were larger than with the single crystal, and the short circuit currents were comparable. The a-Si:H:F film electrode performance was similar to that of a-Si:H film at lower light intensities (up to 50 mW/cm²), but at higher illumination intensities the Si:H:F alloy performed better as the photocurrents with the a-Si:H alloys tend to reach saturation earlier when the intensity of the illuminating light increases. All performance tests were continued for over five hours to demonstrate stability.

EXAMPLE 6

Amorphous films of Si:H$_x$ alloys were prepared by r.f. glow discharge and doped with phosphorus to make n-type semiconductors. One of the films was coated with a layer of Nb$_2$O$_5$ about 25 to 30 angstroms thick deposited by the same r.f. glow discharge method. The performance of liquid-junction photovoltaic cells based on these films was studied in a 0.1M TBAP/EtOH solution containing ferrocene/ferrocenium as a redox couple at a light intensity of 100 mV/cm². Coating the a-Si n-type film with a thin layer of Nb$_2$O$_5$ further improved its photoelectrochemical performance as seen in Table 2. Thus, with a-Si:Hx film coated with a thin film of Nb$_2$O$_5$ the onset potential for the photocurrent decreased by 20 mV, the short circuit current increased by 25% and the fill factor of typical cells increased from 0.25 to about 0.30.

TABLE 2

| ELECTRODE | V$_{onset}$ (V, SCE) | V$_{oc}$ (V, Pt) | I$_{sc}$ (mA/cm²) | V$_m$ (V, Pt) | I$_m$ (mA/cm²) | FF | n % |
|---|---|---|---|---|---|---|---|
| uncoated | −0.58 | 0.81 | 0.76 | 0.40 | 0.40 | 0.26 | 0.16 |
| coated | −0.60 | 0.83 | 1.00 | 0.40 | 0.60 | 0.29 | 0.24 |

Modifications and variations of the present invention are possible in light of the above teachings. For example, either or both of the photoelectrodes 14 and 16 can include a photocorrosion stabilization layer to further enhance the stability of the electrode. The stabilization layer can be a thin layer of platinum, iridium, or similar type metal silicide as has been described with crystalline electrodes by Fan et al., "Semiconductor Electrodes", *Journal of the Electrochemical Society*, Vol. 129, No. 7, pp 1647-1649, July 1982. It is therefore, to be understood that within the scope of the appended claims, the invention can be practiced otherwise than as specifically described.

What is claimed and desired to be secured by Letters Patent of the United States is:

1. A photoelectrochemical cell for the conversion of sunlight into electrical energy for the production of hydrogen gas comprising:
   a cell having an interior space therein, said space divided by a membrane positioned in said space to form an anode compartment and a cathode compartment within said cell;
   an electrolyte without an added redox couple in said anode compartment and in said cathode compartment;
   a photocathode positioned in said cathode compartment with at least a portion in contact with said electrolyte;
   an electrode positioned in said anode compartment with at least a portion in contact with said electrolyte;
   said photocathode being a photoelectrode and including a substrate having a deposition surface, an electrically conductive lead, and a thin film amorphous silicon semiconductor alloy body deposited on the substrate having at least a first and a second layer, the first layer being adjacent the substrate being p+ type and including a p type dopant at a concentration of about $10^{23}$ atoms/cm$^3$ and adapted to be coupled to the electrically conductive lead, said semiconductor alloy body having enhanced resistance to photocorrosion while operating in the absence of an added redox coupled in said electrolyte; and
   means for impinging photons upon said photoelectrode wherein sunlight will be converted into energy usable as electricity or a fuel.

2. The cell as defined in claim 1, wherein said cell further includes an electrical power source electrically coupled to said electrodes wherein photoassisted electrolysis will occur.

3. The cell as defined in claim 1, wherein said cell further includes an electrical load electrically coupled to said electrodes wherein sunlight is converted into electrical energy.

4. The cell as defined in claim 1, wherein said substrate of said photoelectrode is a material selected from a group consisting of glass and stainless steel.

5. The cell as defined in claim 1, wherein said semiconductor alloy of said photoelectrode is a-Si:H$_x$.

6. The cell as defined in claim 1, wherein said semiconductor alloy of said photoelectrode is a-Si:F:H.

7. The cell as defined in claim 1, wherein said photoelectrode further comprises a reflective layer deposited on the deposition surface of said substrate, said reflective layer interposed between said substrate and said first layer.

8. The cell as defined in claim 7, wherein said reflective layer of said photoelectrode is a material selected from a group consisting of aluminum and molybdenum.

9. The cell as defined in claim 1, wherein the second layer of said photoelectrode is substantially intrinsic.

10. The cell as defined in claim 1, wherein said first and second layer of said photoelectrode are each doped with said dopant in different concentrations.

11. The cell of claim 10 wherein said dopant is boron and said second layer is doped to a concentration of about $10^{17}$ atoms/cm$^3$.

12. The cell as defined in claim 1, wherein said p type dopant is boron.

13. A cell as defined in claim 1, wherein said second layer is a substantially intrinsic amorphous silicon semiconductor alloy, said semiconductor alloy body further including a third layer of an n+ type amorphous silicon semiconductor alloy overlying said second layer.

14. A cell as defined in claim 13, wherein said first layer of said photoelectrode is doped with boron and said third layer is doped with phosphorus to a concentration of about $10^{27}$ atoms/cm$^3$.

15. A cell as defined in claim 1, wherein said photoelectrode further includes a thin film oxide layer deposited to cover said semiconductor body.

16. A cell as defined in claim 15 wherein said oxide layer is an amorphous silicon based oxide or $Nb_2O_5$.

* * * * *